Figure 1:
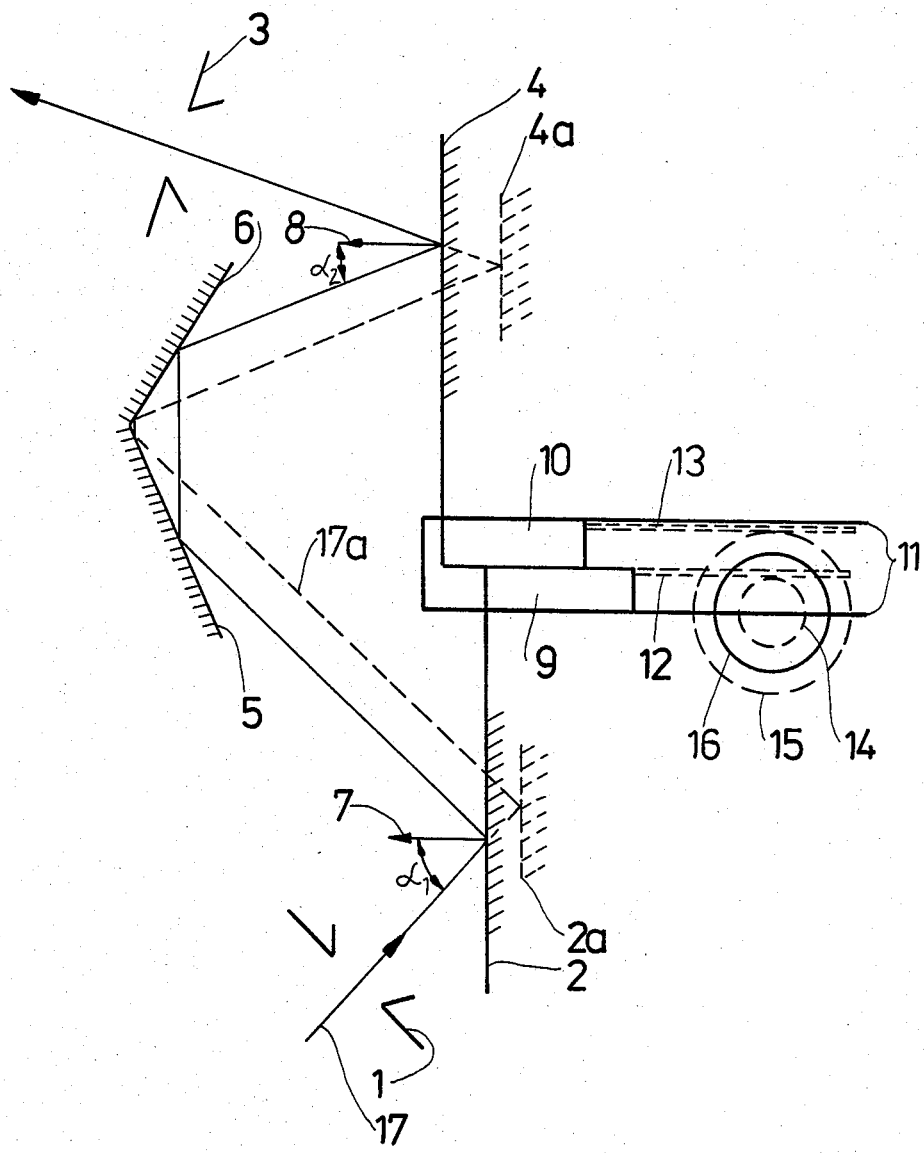

United States Patent [19]

Grosser

[11] Patent Number: 4,547,041
[45] Date of Patent: Oct. 15, 1985

[54] ARRANGEMENT FOR OPTICAL PATH LENGTH VARIATION

[76] Inventor: Johannes Grosser, 2, Ziegelmühlenweg, 69 Jena, District of Gera, German Democratic Rep.

[21] Appl. No.: 312,193

[22] Filed: Oct. 16, 1981

[30] Foreign Application Priority Data

Dec. 1, 1980 [DD] German Democratic Rep. ... 225597

[51] Int. Cl.$^4$ .......................... G02B 5/08; G02B 5/10
[52] U.S. Cl. .................................. 350/622; 350/626; 350/486; 350/569
[58] Field of Search ............... 350/299, 301, 486, 487, 350/563, 564, 550, 569, 445

[56] References Cited

U.S. PATENT DOCUMENTS

| | | | |
|---|---|---|---|
| 2,725,800 | 12/1955 | Dewhurst | 350/445 X |
| 3,642,343 | 2/1972 | Tchejeyan et al. | 350/445 X |
| 3,871,750 | 3/1975 | Mecklenborg | 350/286 |
| 3,947,188 | 3/1976 | Simpson | 350/445 X |

OTHER PUBLICATIONS

Wiley, J. P. "Constant Path Length Optical Scanner," IBM Technical Disclosure Bull., vol. 15, No. 4, (Sep. 1972), p. 1291.

Primary Examiner—John K. Corbin
Assistant Examiner—Richard F. Gallivan

[57] ABSTRACT

The invention relates to an arrangement for varying the optical path length in an optical device without varying its overall dimensions comprising an entrance reflector and an exit reflector the planes of incidence of which are substantially arranged in one plane and the normals erected upon said planes are unidirectional, and an even number of deviating reflectors located between said entrance reflector and said exit reflector. The variation of the optical path length is realized by displacing the entrance reflector and the exit reflector uniformly in any, however, the same direction. A combination of individual arrangements is feasible.

3 Claims, 3 Drawing Figures

ARRANGEMENT FOR OPTICAL PATH LENGTH VARIATION

The invention relates to an arrangement for varying the optical path length in optical devices without varying the geometry of a device in which it is used, particularly for microscopes, telescopes and optical measuring devices etc.

The inventional arrangement can be employed in visible light but also in substantially any electromagnetic radiation. Arrangements for effecting optical path length variations can be discrete optical units which are installed, for example, as focussing tubes in diverse optical devices such as microscopes, telescopes, adjustment units, interference units, magnifying devices having variable or non-variable imaging scales.

Previous arrangements for optical path length variations use pentaprisms and angle prisms, respectively, as disclosed in the U.S. Pat. No. 3,947,188, and Bauernfeind prisms as disclosed in the U.S. Pat. No. 3,871,750. When combining two reflection faces, the planes of incidence being arranged in a common plane, the above arrangements exhibit two preferential directions.

When the entire reflection system is displaced along one of the two preferential directions an image produced is laterally displaced, whereas when displaced along the other of the two preferential directions only optical path lengths variations are involved. Said arrangements permit varying the path length without varying the overall dimensions.

These arrangements are, however, disadvantageous since inaccuracies in the guide ways for members which cause the lateral displacements simultaneously produce undesired variations in the optical path length, and, inaccuracies in the guiding means for the members producing the optical path length variations involve interfering lateral image displacements. Furthermore, in the above arrangements the reflecting planes are inclined relative to each other which reduces their application range.

It is an object of the invention to obviate the above disadvantages.

It is a further object of the invention to provide an arrangement for optical path length variations which in spite of lateral displacements of the reflection system does not involve lateral displacement of an image and where the optical path length variation is measurable.

It is still a further object of the invention to provide an arrangement for optical path length variation which permits operation at different scale factors.

These and other objects are realised in an arrangement for optical path length variation comprising an entrance reflector and an exit reflector, the normal upon each of the reflector planes are oriented in a same direction. The plane of incidence of the entrance reflector and the plane of incidence of the exit reflector are arranged in one and the same plane.

An even number of non-displaceable deviating reflectors is arranged between the entrance and exit reflector. By different displacements of the entrance and exit reflectors along any common direction an optical path length variation is obtained, where the displacement of the entrance reflector to that of the exit reflector behaves like $\sin\alpha_2/\sin\alpha_1$, where $\alpha_1$ is the angle of incidence of the entrance reflector and $\alpha_2$ the angle of incidence of the exit reflector. The relation between the optical path length variation and the reflector displacement, which is the scale factor, is calculated for the entrance reflector as follows:

$$2\left(\cos\alpha_1 + \frac{\sin\alpha_2}{\sin\alpha_1}\cos\alpha_2\right) = \cos\delta$$

where $\delta$ is the angle between the direction of displacement and the normal upon the plane of the entrance reflector and exit reflector, respectively.

Figure 2:
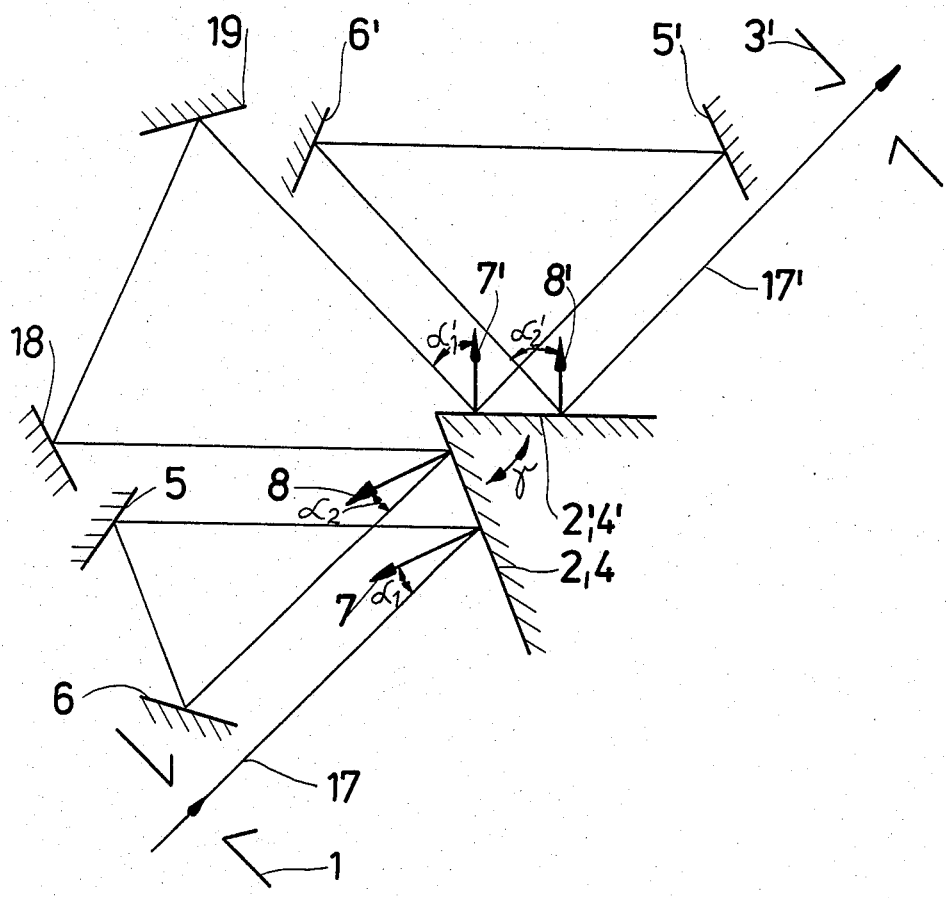
Figure 3:
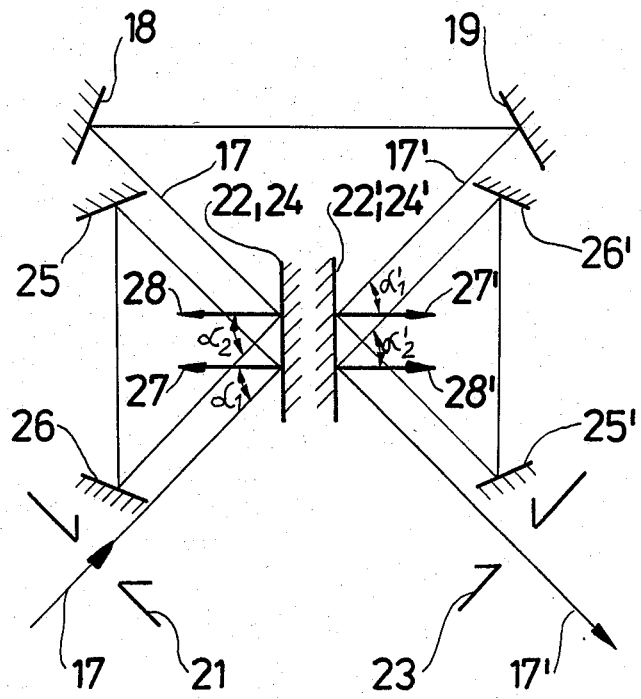

In order that the invention may be more readily understood reference is made to the accompanying drawings which illustrate diagrammatically and by way of example three embodiments thereof and where FIG. 1 is a schematic view of an arrangement for optical path length variation including a reflection system for different angles of incidence, FIG. 2 is a schematic view of an arrangement for optical path length variations including two reflection systems without deviating the path of beams, and FIG. 3 is a schematic view of an arrangement for optical path length variations including two reflection systems deviating the path of beams.

In FIG. 1 an arrangement for path length variations is constituted of a first connection means 1, followed by an entrance reflector 2, an exit reflector 4, and a second connection means 3.

The connection means 1 and 3 are so constructed to permit installation in another device (not shown) and passage of a light beam 17 to the optical members mentioned hereinbefore and thereinafter.

Two nondisplaceable reflectors 5 and 6 are inserted into the path of beam 17 between the reflector 2 and the reflector 4. An angle of incidence $\alpha_1$ between the beam 17 and a normal 7 erected upon the reflector 2 is 45° and an angle of incidence $\alpha_2$ between the beam 17 and a normal 8 erected upon the exit reflector 4 is 20.7°.

The two normals 7, 8 erected upon the reflector planes 2 and 4, respectively, are substantially in parallel and equally oriented. The entrance reflector 2 is connected to a slide 9 and the exit reflector 4 to a slide 10.

Both slides 9, 10 have a common guiding track 11 in parallel to the normals 7, 8.

The slides 9 and 10 are secured to toothed racks 12, 13, respectively, which, in turn, mesh pinions 14 and 15, respectively.

Both pinions are connected to an operation knob 16. The transmission ratio between the rack and pinion 14, 12 and the rack and pinion 15, 13 is 1:2 according to the selection of the angles of incidence $\alpha_1$, $\alpha_2$.

The scale factor of the operation knob 16 is 5.1, that is, the optical path length variation related to the displacement of the entrance reflector is 5.1:1.

In operation the beam 17 enters the arrangement through the connection member 1 to impinge upon the entrance reflector 2 where it is reflected to the two reflectors 5, 6 where the beam is folded to impinge upon the exit reflector 4. The latter reflects the beam 17 through the second exit connection member 3 for further processing. When the operation knob 16 is operated the entrance reflector 2 is displaced by means of the movement of the rack and pinion 12 and 14, respectively, into a dashed line position 2a and the reflector 4 by movement of the rack and pinion 13 and 15, respectively, into a dashed line position 4a.

The displacement of the entrance reflector 2 and the exit reflector 4 takes place in the same direction, however, at a 1:2 relation.

The beam 17 has now a varied path 17a, both beams have a different path length, however, they are not laterally displaced between the entrance member 1 and the exit member 3.

In FIG. 2 a combination of two arrangements for path lengths variations is disclosed.

The combination is obtained by the connecting reflectors 18, 19 which include an angle $\gamma = 67.5°$.

The reference numerals of the second arrangement are primed. The angles of incidence $\alpha_1$, $\alpha_2$ of the first arrangement are 22.5°, and $\alpha'_1$, $\alpha'_2$ of the second arrangement 45°. The entrance reflector 2, and the exit reflector 4 of the first arrangement and the entrance reflector 2', and the exit reflector 4' of the second arrangement, respectively, are constructed as units.

Since the respective angles of incidence $\alpha_1$, $\alpha_2$ and $\alpha'_1$, $\alpha'_2$ are identical, an optical path length variation is obtained by a common displacement of the entrance reflectors 2, 2' and the exit reflectors 4, 4'.

It is advantageous to displace the arrangements in parallel to the beam 17. In this event the scale factor is 0.58. When the angles of incidence $\alpha_1$, $\alpha_2$ of the first arrangement are identical to the angles of incidence $\alpha'_1$, $\alpha'_2$ of the second arrangement, and when the angles between the direction of displacement and the normals 7, 8 to the reflector faces 2, 4 and the normals 7', 8' to the reflector faces 2', 4' have the same amount, then the optical path length is not varied at a common displacement of all entrance reflectors 2, 2' and exit reflectors 2', 4'.

When the entrance reflectors 2, 2' and the exit reflectors 4, 4' are at right angles to each other then the combined arrangements are capable, for example, to determine the relation of longitudinal contraction to the cross contraction of a body.

In FIG. 3 an arrangement for path length variations is constituted of a first system and a second system both being substantially identically constructed, however being arranged in a 180° opposition.

The first system comprises a connection member 21 which permits the passage of a beam 27 and also adaptation to and installation into another optical device (not shown).

A reflector 22 is followed by a first folding reflector 25, a second folding reflector 24 and a reflector 24 which forms a reflector unit with reflector 24.

A first normal 27 to the reflector portion 22 includes an angle of incidence $\alpha_1$ with the incident beam 27, and a second normal 28 onto the reflector portion 24 includes an angle $\alpha_2$ with beam 17 folded at the reflectors 25 and 26. The second system is constituted in mirror symmetry to the first one, the axis of symmetry symmetrically lying between the reflectors 22, 24 on the one hand and the reflectors 22', 24' on the other hand.

A second connection member 23 has the same tasks as member 21. The first and the second system are connected optically by a reflector 19 (first system) and a reflector 18 (second system). The beam 17 directed to the reflectors 22', 24' which are in parallel to the reflectors 22, 24 via the reflectors 19, 18 becomes beam 17' when impinging upon reflector 22'. A normal 27' upon the reflector 22' includes an angle $\alpha'_1$ with the incident beam 17' the latter being reflected to a reflector 25', a reflector 26' to impinge again upon the extended reflector 22', namely 24'.

A normal 28' includes an angle $\alpha'_2$ with the incident beam 17' which leaves the second system through the connecting member 23. The two coupling reflectors 18, 19 are non-displaceable.

However, they are not restricted to the shown number and position. In operation a common displacement of the entrance reflectors 22, 22' and of the exit reflectors 24, 24' by a not shown means along any desired direction except in parallel to the axis of symmetry produces different optical path length variations between both systems, which together yield zero.

When the two systems are displaced by the not shown means at equal amounts, however, in opposite directions, a sum of optical path length variations is produced between the entrance connection member 21 and the exit connection member 23.

The above embodiment permits the introduction of a second beam between the first and the second system.

It is also feasible to insert two beam splitting faces into said arrangement which permits a modulation of beams at a suitable length of coherence.

The above arrangement is modified as follows:

The faces 22, 24 and 22', 24' are the surface of an oscillating crystal. A beam splitting entrance reflector arranged between the connection member 21 and the entrance reflector 22 splits the beam 17 into two partial beams.

One partial beam passes the arrangement and is fused with the other partial beam at an exit beam splitting reflector arranged between the exit reflector 24' and the second connection member 23.

Furthermore, it is feasible to combine a plurality of systems such as the first and second system.

It is also feasible to omit the coupling reflectors. The invention is not restricted to the above embodiments. Thus it lies within the scope of the invention to have the normals erected upon the entrance and exit reflector oriented unidirectional, and an odd number of folding reflectors is arranged between the entrance reflector and the exit reflector, whereas the orientation of the deviating angles is opposite.

The variation of the optical path length is obtained by displacing the entrance reflector and the exit reflector in the same direction.

I claim:

1. Reflection system for optical path length variation comprising in an optical path of beams in optical alignment, an entrance reflector, beam deflecting optical elements, an exit reflector, said beam deflecting elements being arranged between said entrance reflector and said exit reflector, the plane of incidence of said entrance reflector and the respective plane of said exit reflector being coincident, the normal upon said entrance reflector and the normal upon said exit reflector being parallel and unidirectional, a first slide means for supporting said entrance reflector, a second slide means for supporting said exit reflector, and gear means for simultaneously displacing said first slide means and said second slide means about different amounts to obtain said path length variation.

2. A reflection system as claimed in claim 1, wherein said beam deflecting means are constituted of an even number of non-displaceable deviating reflectors and wherein the paths of beams reflected at said entrance reflector and at said exit reflector are unidirectional.

3. A reflection system as claimed in claim 1, wherein said beam deflecting means are constituted of an odd number of non-displaceable deviating reflectors and wherein the paths of beams reflected at said entrance reflector and at said exit reflector are unidirectional.

* * * * *